(12) United States Patent
Wood

(10) Patent No.: US 7,290,781 B2
(45) Date of Patent: Nov. 6, 2007

(54) MOTORCYCLE FRAME PROTECTION DEVICE

(76) Inventor: Eric Charles Wood, 1384 E. St., Mansfield, MA (US) 02048

( * ) Notice: Subject to any disclaimer, the term of this patent is extended or adjusted under 35 U.S.C. 154(b) by 294 days.

(21) Appl. No.: 11/037,899

(22) Filed: Jan. 18, 2005

(65) Prior Publication Data
US 2005/0156405 A1 Jul. 21, 2005

Related U.S. Application Data

(60) Provisional application No. 60/536,752, filed on Jan. 15, 2004.

(51) Int. Cl.
B62J 23/00 (2006.01)
B62J 25/00 (2006.01)
B62J 27/00 (2006.01)
B60R 19/02 (2006.01)

(52) U.S. Cl. .................. 280/304.3; 293/105

(58) Field of Classification Search .......... 293/102, 293/105, 126, 128; 248/636, 677, 678; 280/304.3; 411/372.6, 374
See application file for complete search history.

(56) References Cited

U.S. PATENT DOCUMENTS 4,546,993 A * 10/1985 Walker .................. 280/291
4,629,154 A * 12/1986 Kataczynski ............ 248/610
5,524,918 A * 6/1996 Peabody et al. ........ 280/291
5,630,687 A * 5/1997 Robinson ............... 411/372.6
5,884,983 A * 3/1999 Wu ....................... 301/124.1
6,129,370 A * 10/2000 Hsieh et al. ............ 280/291
6,161,859 A * 12/2000 Cheng .................... 280/291
6,969,082 B2 * 11/2005 Griffin et al. ........... 280/291
7,055,843 B2 * 6/2006 Kan et al. ............... 280/304.3
7,159,886 B2 * 1/2007 Schloegel ............... 280/291
2003/0222425 A1 * 12/2003 Dennert et al. ......... 280/291

* cited by examiner

Primary Examiner—Lesley D. Morris
Assistant Examiner—Daniel Yeagley
(74) Attorney, Agent, or Firm—Michael L. Greenberg, Esq.; Greenberg & Lieberman, LLC

(57) ABSTRACT

A device for protecting the frame of a motorcycle from damage in the event of a crash with an easily replaceable wear pad. This invention is generally comprised of a base and a wear pad that are secured together. To accomplish the installation of this device the base is directly secured to the motorcycle using a primary bolt that runs through the center of the base. The base of the device acts as the mounting apparatus for the wear pad portion the assembly. The wear pad, which has a recess at the bottom that closely matches the outer diameter of the base, is then slid over top of the base. The wear pad is then attached to it with one or more securing devices (bolts, pins or similar devices) that are perpendicular to the primary bolt. Replacement of the wear pad is accomplished by removing the securing device or devices, which are perpendicular to the primary bolt, while the base remains fixed to the motorcycle.

9 Claims, 3 Drawing Sheets

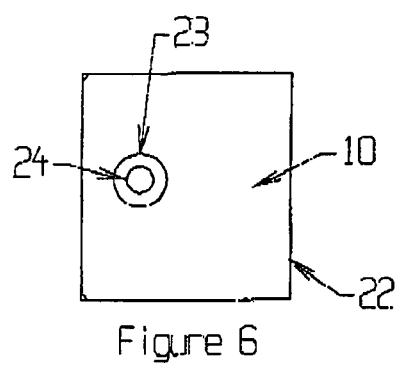
Figure 6
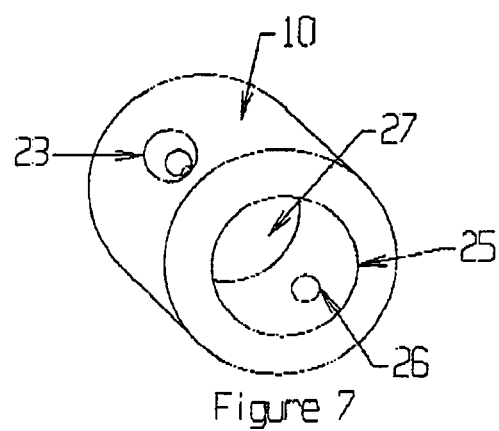
Figure 7
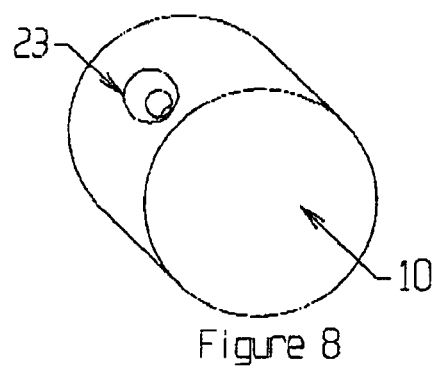
Figure 8
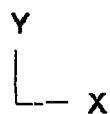

MOTORCYCLE FRAME PROTECTION DEVICE

Priority is hereby claimed to provisional patent application number 60/536,752 filed on Jan. 15, 2004.

FIELD OF THE INVENTION

The present invention is a piece that protrudes from a motorcycle frame to prevent damage to the motorcycle. More specifically, the present invention prevents the motorcycle frame from hitting the ground and becoming marred and damaged, as the present invention contacts the ground first, taking all or most of the ground's impact.

BACKGROUND OF THE PRESENT INVENTION

While motorcycles are typically ridden so that they are somewhat perpendicular to the road surface, when rounding road curves, motorcycles lean away from the perpendicular. The leaning away from the perpendicular becomes especially apparent when motorcycles are raced, as the rider's knee will typically skim the surface of the racetrack because the motorcycles lean so close to the plane of the racetrack. There is an ever-present danger that the motorcycles will actually slide across the racetrack as they lose grip on the racetrack curve. In such cases, when the motorcycles' tires lose grip, the motorcycles typically slide and crash out of control. The motorcycles' frames suffer expensive damage in such cases.

There is a need for a device that prevents damage to a motorcycle frame so as to prevent the motorcycle frame from impacting and/or scraping the ground. A plethora of devices called "frame sliders" are sold to prevent damage to a motorcycle frame, as detailed below.

The most common frame slider assembly, which is sold by a number of manufacturers, attaches a skid pad directly to the frame of the motorcycle by using a primary bolt that runs though the center of the skid pad. The concept is that the skid pad will take the abrasion from the racetrack, and damage to the motorcycle frame will be prevented. When the skid pad wears out, a new skid pad can replace it. This design often causes difficulty in removal of the skid pad because the pad can deform in a crash, partially covering the opening of the primary bolt and making access difficult. Another problem with this design is that the primary bolt often threads into an aluminum cylinder head of the motorcycle. Frequent removal and engagement of the primary bolt can damage the aluminum cylinder head, an undesired result.

To use any of the common frame sliders, the user bolts a plastic slider to the frame of a motorcycle. As aforementioned, when the user tips the motorcycle, rather than scratching or scraping the motorcycle frame, the user scratches or scrapes the frame slider. While the motorcycle is protected, the frame slider takes damage, and oftentimes the hole in the skid pad deforms so that the user can no longer get the skid pad to slip off the bolt. Another disadvantage of these frame sliders is that the skid pad is hollow so that it can receive the primary bolt, but being hollow means that the frame slider has less material, so it wears out faster than desired.

There are two products that allow removal of the skid pad without the removal of the primary bolt, but each has its limitations. Both of the products secure a base to the motorcycle using a primary bolt that holds a skid pad via threads on the skid pad. The main limitations of one of the product is the propensity for the skid pad to spin off during a crash, as the skid pad simply unfurls from the base as the ground rotates the skid pad about the base. Further, a great deal of physical effort is required to completely tighten or remove the skid pad from the base.

A second product also allows removal of the skid pad without the removal of the primary bolt. The second product has the skid pad attached to the base using a second bolt that runs through the center of the skid pad and threads in to base. This design often presents difficulty in removal of the skid pad because the skid pad can deform in a crash, partially covering the opening to the second bolt, making access to the second bolt difficult.

Thus, there is a need for a device that prevents damage to a motorcycle frame so as to prevent the motorcycle frame from impacting and/or scraping the ground; but such a device must be easy to assemble and disassemble, and such a device must be capable of not being deformed so as to prevent removal after a crash. Moreover, there is a need for a device that is longer lasting than the typical frame slider.

SUMMARY OF THE INVENTION

The present invention provides a new and useful replaceable wear pad motorcycle frame protection device, which is simpler in construction, more universally usable, and more versatile in operation than relevant art.

The present invention has a base and a wear pad that are secured together. The base is directly secured to the motorcycle by a primary bolt that runs through the center of the base. The wear pad is then slid over the exposed portion of the base and then attached to it with hardware that is perpendicular to the primary bolt.

The object of the present invention is to provide a replaceable wear pad motorcycle frame protection deice that addresses the problems presented by the relevant art. The present invention allows for replacement of the portion of the assembly that is expected to wear without removal of the primary bolt. The encapsulation of the base with the skid pad ensures that the skid pad will remain in place in the event of a crash. The skid pad attachment bolt being oriented perpendicular to the primary bolt ensures easy access to the bolt in the event that the skid pad becomes deformed.

A principal object of the present invention is to provide a replaceable wear pad motorcycle frame protection device that will overcome the deficiencies of the relevant art.

A second object of the present invention is to provide a replaceable wear pad motorcycle frame protection device that has a replaceable wear pad that partially encapsulates the base of the device.

A third object of the present invention is to provide a replaceable wear pad motorcycle frame protection device that features a replaceable wear pad that can be replaced by the removal of only securing devices that are oriented perpendicular to the primary bolt that fixes the base to the motorcycle.

BRIEF DESCRIPTION OF THE DRAWINGS

FIG. 6. is a side view of the wear pad portion of a replaceable wear pad motorcycle frame protection device according to the present invention.

FIG. 7. is a front perspective view of the wear pad portion of a replaceable wear pad motorcycle frame protection device according to the present invention.

FIG. 8. is a rear perspective view of the wear pad portion of a replaceable wear pad motorcycle frame protection device according to the present invention.

DETAILED DESCRIPTION OF THE PRESENT INVENTION

Referring now descriptively to the drawings, the attached figures illustrate a motorcycle frame protection device.

Figure 1:
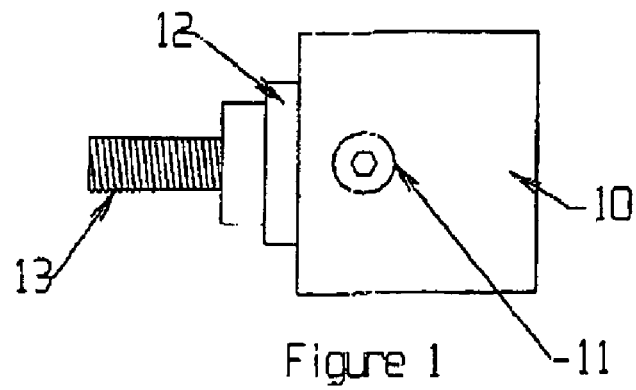
FIG. 1. is a side view of a replaceable wear pad motorcycle frame protection device assembly, with hardware, according to the present invention.

FIG. 1 illustrates a side view of a motorcycle frame protection device according to the present invention, protecting the frame of a motorcycle from crash damage with an easily replaceable skid pad.

Figure 2:
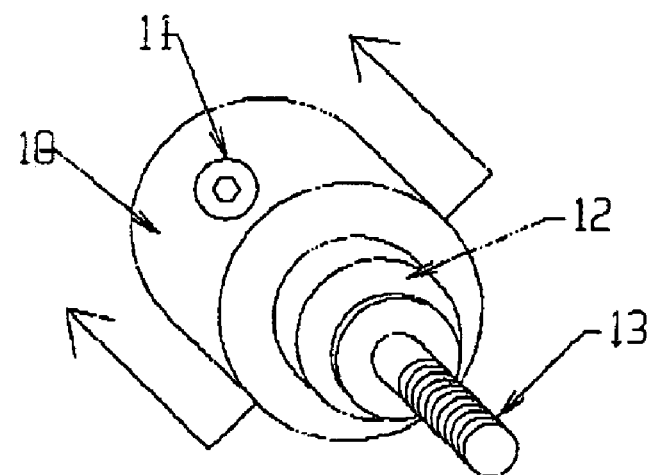
FIG. 2. is a front perspective view of a replaceable wear pad motorcycle frame protection device assembly, with hardware, according to the present invention.

The present invention is generally comprised of a base 12 and a wear pad 10 that are bolted together with hardware 11 to comprise a single embodiment, as shown in FIG. 2.

Figure 3:
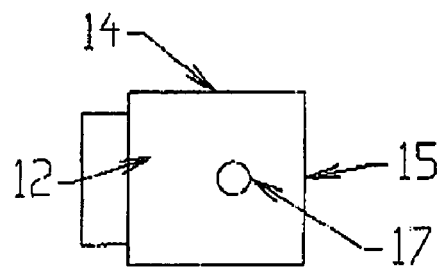
FIG. 3. is a side view of the base portion of a replaceable wear pad motorcycle frame protection device assembly according to the present invention.
Figure 5:
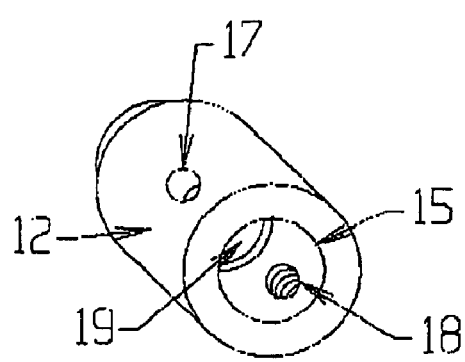
FIG. 5. is a rear perspective view of the base portion of a replaceable wear pad motorcycle frame protection device according to the present invention.
Figure 4:
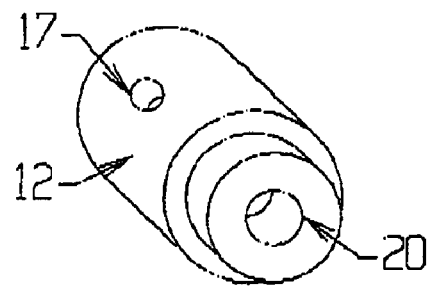
FIG. 4. is a front perspective view of a replaceable wear pad motorcycle frame protection device according to the present invention.

FIGS. 3, 4, and 5 show a side view, rear perspective view and front perspective view of the base 12 portion of the assembly. FIGS. 6, 7, and 8 show a side view, rear perspective view and front perspective view of the wear pad 10 portion of the assembly.

The use of the invention is to protect a motorcycle frame from damage in the event of a crash. In order to accomplish this, the base 12 is secured to the motorcycle using the primary attachment bolt 13 by passing the primary attachment bolt 13 through the hole 19 on the back side of the base 12, as seen in FIG. 5. The bolt then protrudes through the hole 20 in the base, as seen in FIG. 4. The exposed threads are used to secure the base 12 of the assembly to the motorcycle.

With the base 12 secure on the motorcycle, the wear pad 10 is then attached to the base 12. The base 12 is partially hollow on the inside, as shown in FIG. 7. The bottom surface 27 of this hollow is deep enough to encapsulate the outer diameter 14 of the base, shown in FIG. 3. When the wear pad 10 is in place, the bottom surface 27 sits securely on the top surface 15 of the base, which is shown in FIG. 3.

FIG. 5 shows one embodiment of the base 12 of the invention. This embodiment allows for the hardware 11 used to secure the wear pad 10 to the base 12 to be a bolt that passes through the top hole 23 of the wear pad, shown in FIGS. 7 and 8, through the top hole 17 of the base, shown in FIGS. 4 and 5. The bolt then engages the threads 18 of the base 12, as shown in FIG. 5, and passes through the hole 26 of the wear pad, shown in FIG. 7.

Referring to FIGS. 3, 5, and 7, the inner diameter 25 of the wear pad 10 fits closely over the outer diameter 14 of the base 12. The outer diameter of the attachment hardware 11, shown in place in FIGS. 1 and 2, fits closely inside the hole 26 of the wear pad 10. The bottom surface 27 of the wear pad 10 sits tightly on the top surface 15 of the base 12. When the attachment hardware 11 is placed through holes 23 and 17, engaged into the threads 18 in the base 12 and then passed through the hole 26 in the wear pad 10 the complete assembly is held securely.

Once secured together the entire assembly, as shown in FIG. 1, is attached to the side of the motorcycle and protrudes far enough beyond the outer surface of the motorcycle that it is the first object to contact the ground in the event of an accident where the motorcycle falls on its side.

Referring again to the FIG. 1, the entire assembly is long enough that the wear pad 10 will hit the ground first in the case of an accident. The outer surface of the wear pad 10 is the portion of the assembly that will hit the ground and sustain damage in the event of an accident. Once damaged, the wear pad can be easily replaced with the removal of the attachment hardware 11. The attachment hardware 11, due to its orientation perpendicular to the primary mounting bolt 13, is not likely to be damaged in a crash.

The drawings in FIG. 1 show one method of attachment of the wear pad 10 to the base 12. Any other means of attachment using a fastener that is oriented perpendicular to the primary bolt 13 are within the scope of this invention.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention and the scope of the following claims.

I claim:

1. A motorcycle frame protection device, comprising:
    a base;
    a wear pad, having an open bottom end to fit upon said base, wherein said wear pad is formed as a cap having a solid top surface and sidewalls which encapsulate an end portion of said base;
    a first hole and a second hole at opposite ends of said base, said first hole and said second hole on the sidewalls of said base;
    a third hole and a fourth hole at opposite ends of said base, said third hole and said fourth hole on the top and the bottom of said base; and
    a fifth hole and a sixth hole at opposite ends of said wear pad, said fifth hole and said sixth hole on the side wails of said wear pad;
    wherein a first bolt through said first hole, second hole, fifth hole, and sixth hole secures said wear pad to said base; and
    wherein a second bolt through said third hole and fourth hole secures said base to the motorcycle frame.

2. The device of claim 1, wherein said base is cylindrical.

3. The device of claim 1, wherein said wear pad is cylindrical.

4. The device of claim 1, wherein said wear pad has a bottom surface extending between said fifth hole and said sixth hole.

5. The device of claim 1, wherein said wear pad fits closely over said base.

6. The device of claim 1, wherein said wear pad is partially hollow.

7. The device of claim 4, wherein said wear pad is completely solid between said bottom surface of said wear pad and said top surface of said wear pad.

8. A motorcycle frame protection device. comprising:

a base;

a wear pad, fitting on said base, wherein said wear pad is formed as a cap having a solid top surface and sidewalls which encapsulate an end portion of said base;

a primary bolt, inserted through a top of said base and into the motorcycle frame; and a second bolt, positioned perpendicular to said primary bolt, protrudes through said wear pad and said base to hold said wear pad to said base.

9. The device of claim 8, wherein said primary bolt is positioned below said second bolt.

* * * * *